United States Patent [19]

Kapralis

[11] Patent Number: 4,576,282
[45] Date of Patent: Mar. 18, 1986

[54] REINFORCED LIGHTWEIGHT PLASTIC PACKAGES

[76] Inventor: Imants P. Kapralis, 3020 S. Punta Del Este Dr., Hacienda Heights, Calif. 91745

[21] Appl. No.: 609,717

[22] Filed: May 14, 1984

[51] Int. Cl.[4] .............................................. B29D 27/04
[52] U.S. Cl. .................................. 206/524; 264/45.2; 264/46.4; 53/474
[58] Field of Search .............. 206/524; 264/45.2, 46.4, 264/275; 53/474

[56] References Cited

U.S. PATENT DOCUMENTS

| | | | |
|---|---|---|---|
| 3,204,385 | 9/1965 | De Remer et al. | 206/524 |
| 3,345,245 | 10/1967 | Hanusa | 206/524 |
| 4,136,141 | 1/1979 | Bauer et al. | 206/524 |
| 4,254,870 | 3/1981 | Foote et al. | 206/524 |

FOREIGN PATENT DOCUMENTS 2263953  7/1974  Fed. Rep. of Germany ...... 206/524

Primary Examiner—Joseph Man-Fu Moy
Attorney, Agent, or Firm—William W. Haefliger

[57] ABSTRACT

A thin walled, light-weight, relatively flexible, molded plastic package has first and second re-entrant recesses respectively at opposite sides of the package, the package stiffened against crushing. The package includes:
(a) the first re-entrant recess at one side of the package containing sufficient of a predetermined quantity of an expanded synthetic resin as to substantially fill said recess, and
(b) the expanded resin cured to form a hardened reinforcing core in said first re-entrant recess and integrally with the package to stiffen same against crushing, whereby an article or articles placed in the second re-entrant recess at the opposite side of the package are protected against crushing.

15 Claims, 5 Drawing Figures

REINFORCED LIGHTWEIGHT PLASTIC PACKAGES

BACKGROUND OF THE INVENTION

This invention relates generally to lightweight crushable plastic packages, and more particularly concerns reinforcement of same by taking advantage of re-entrant recess construction of such packages.

Lightweight plastic packages have came into extensive use for computer software media such as floppy discs, tape reels, cassettes and the like. One major disadvantage of such packages is that their lightweight construction necessarily makes them vulnerable to crushing, with consequent damage to the media. Attempts have been made to re-inforce the packages as by inserting cardboard stiffeners into package walls; however, the crush-damage problem remains. There is a need for a package and method of constructing same which eliminates the crush vulnerability problem.

SUMMARY OF THE INVENTION

It is a major object of the invention to provide a solution to the above problem, as well as to provide additional advantages in package construction and media protection, as will appear. Basically, and as respects the method of the invention, it concerns reinforcement of a thin-walled, lightweight, relatively flexible and crushable molded plastic package having first and second re-entrant and elongated recesses at opposite sides of the package, the method steps including:

(a) introducing into said first re-entrant recess at one side of the package sufficient of a predetermined quantity of an expansible synthetic resin as to substantially fill said recess when expanded, (b) providing a pressure wall at said side of the package to confine the resin as it expands causing flow of the expanding resin to substantially fill said recess, (c) and allowing said expanded resin to cure and form a hardened re-inforcing core in said one re-entrant recess and integrally with the package to stiffen same against crushing, whereby an article or articles places in the second re-entrant recess at the opposite side of the package are protected against crushing.

The method may include additional steps such as removing the pressure wall when the resin has filled the recess or recesses; providing a cover sheet to extend over the first re-entrant recess; employing a stiff protective board to extend over the first recess and hardened core therein, for more extensive protection of the media in the second re-entrant recess; and enclosing the media between two such hardened core in the form of frames, as will appear.

These and other objects and advantages of the invention, as well as the details of an illustrative embodiment, will be more fully understood from the following specification and drawings, in which:

DRAWING DESCRIPTION

DETAILED DESCRIPTION

Figure 1:
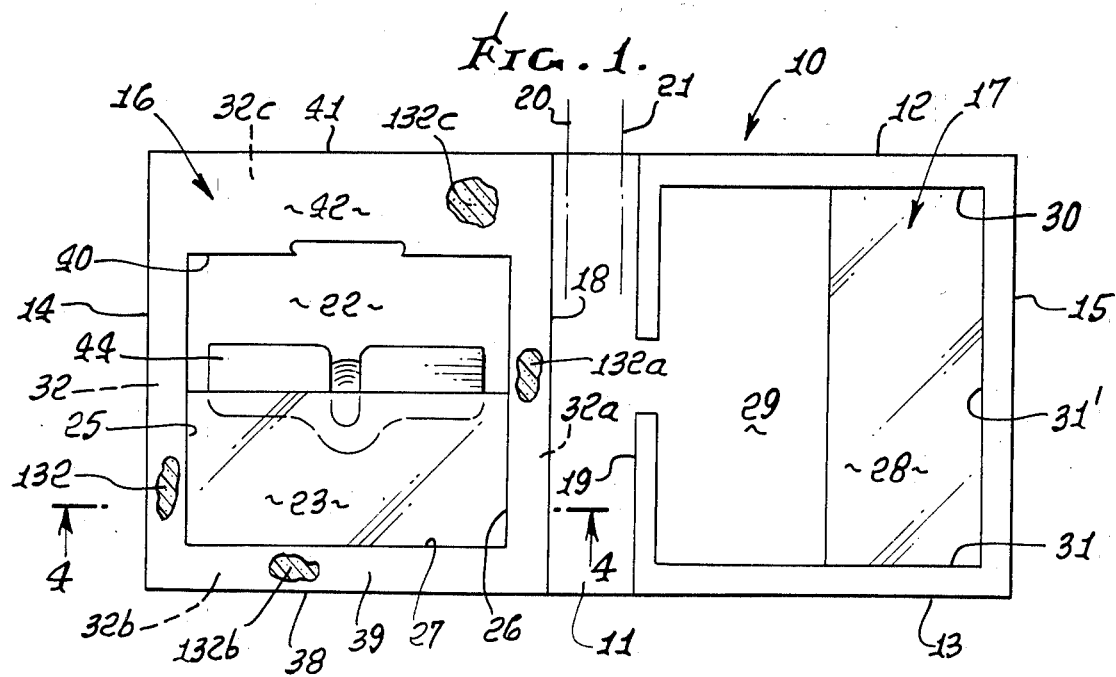
FIG. 1 is a plan view of a flexible, molded plastic package.

In FIG. 1, the thin-walled, light-weight molded plastic package 10 has a thin base sheet 11 with longitudinally elongated opposite edges 12 and 13, and laterally elongated opposite edges 14 and 15. The package may include left and right portions 16 and 17, left portion 16 located between parallel edge 14 and wall 18, and right portion located between parallel edge 15 and wall 19. Walls 18 and 19 extend laterally, and are longitudinally separated. Accordingly, portion 17 may be brought over portion 16 as by folding the base sheet along parallel hinge lines 20 and 21 which extend laterally, to close the package. Note that portion 16 defines a "second" re-entrant recess or compartment 22 to receive goods or ware, such as computer software (for example floppy discs), retainable beneath transparent plastic flap 23 edge-attached at 24 to the walls 25, 26, and 27 to partially cover compartment 22. A similar flap 28 partially covers a "second" re-entrant recess or compartment 29 in package portion 17, and is edge-attached to walls 30-31'. Ware may therefore be placed in compartment 29, and extended under flap 28, for retention. This pack construction may be varied, but is extremely well adapted to incorporation of the invention.

Each portion 16 and 17 of the package also includes a "first" re-entrant recess at the opposite side of the package. See for example recess 32 which opens upwardly and recess 22 which opens downwardly, in FIG. 2, these recesses separated by thin plastic wall 25 integral with the base sheet 11, the package being inverted to rest on base 33. Note also package wall 34 parallel to wall 25, and wall 35 parallel to wall 11 and integral with walls 25 and 34. In similar manner, see walls 26, 18 and 37 bordering re-entrant "first" recess 32a. There are similar wall groups indicated at 27,38 and 39, and at 40–42, bounding legs or extensions 32b and 32c of recess 32. Since walls 25, 34, 26, 18, 27, 38 and 40 and 41 are characteristically somewhat flexible, the package can be, and at times is, subject to unwanted crushing and leading to damage of the floppy disc packages indicated at 44 in FIG. 1.

Figure 2:
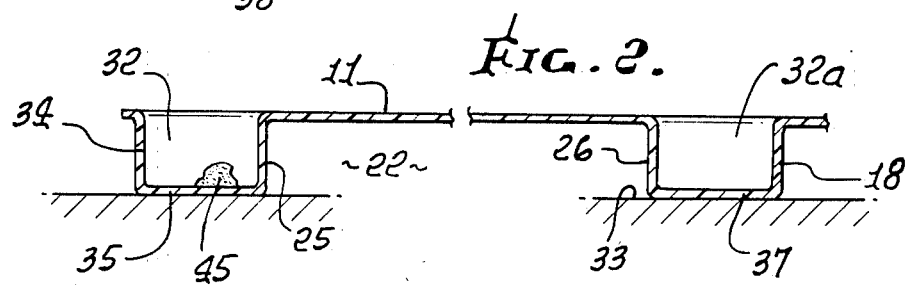
FIGS. 2-4 are enlarged sections showing steps in the production of the FIG. 1 package, and taken, for example, on lines such as 4—4 of FIG. 1.

In accordance with the invention, and referring to FIG. 2, a predetermined quantity or quantities 45 of expansible synthetic resin are introduced into the "first" re-entrant recess 32, along its length, or at locations along its length, and also into the recess extensions 32a–32c. Such quantities are sufficient to just fill these re-entrant recesses or legs 32, 32a, 32b and 32c, when the resin expands; however, the resin will expand unevenly and out of the recess, unless controlled.

Figure 3:
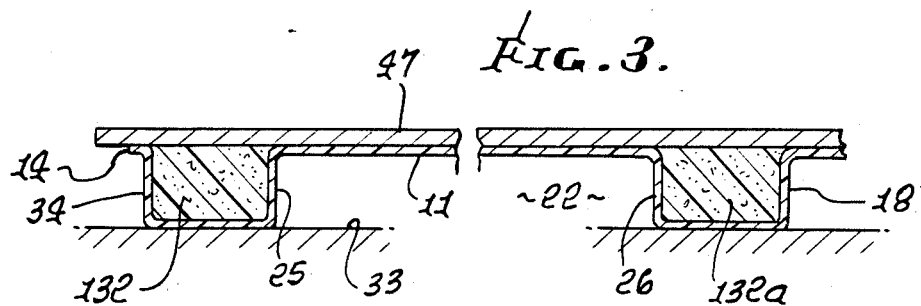

To provide such control, a pressure plate or wall 47 is provided at the upper side of the inverted package, as seen in FIG. 3, to seat on base sheet 11 and cover the first recesses 32, 32a, 32b, and 32c. The plate re-directs the expanding resin to flow along the lengths of the recesses or channels, so as to completely fill same when expansion is completed. The resin is then allowed to cure, and form a hardened re-inforcing core as indicated at 132, 132a, 132b and 132c (see FIGS. 3 and 1) having the form of a rigid rectangular frame, i.e. the core resin is joined at the ends of the first recesses 32,32a, 32b, and 32c. Accordingly, an exceedingly strong, non-crushable, rigid core and package is produced, the rigid core extending protectively about the second re-entrant recess or compartment that contains the ware, such as software media.

Figure 4:
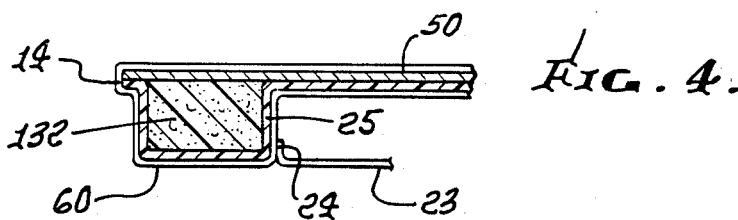

FIG. 4 shows a protective hard board 50 (such as chipboard) extending over the sheet 11 and core 132 (as well as over core legs 132a–132c). Thus, when package portion 17 is folded back over portion 16 (or vice versa) the software media is completely protected by the rigid core frames and by the two hard boards (50 and a similar board associated with portion 17), whereby the media cannot be crushed or damaged, yet the package retains its light-weight construction.

Figure 5:
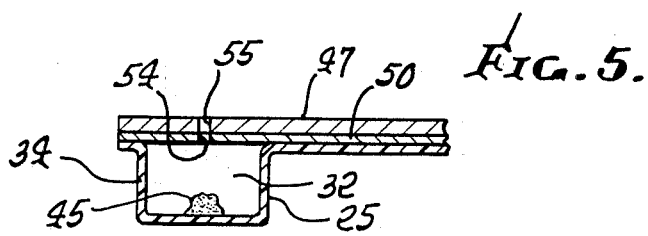
FIG. 5 is a section showing a modification.

FIG. 5 shows pressure plate 47 applied over board, to exert pressure and thereby confine the expanding resin to flow as described above. Note holes 54 and 55 in the board and plate, via which resin 45 may be introduced into channel or recess 32.

In the above, the introduced resin may consist of styrofoam; and the molded package walls 11, 25, 34, 35 and 89 may consist of polyvinylchloride.

FIG. 4 also shows a final application of a thin decorative plastic exterior "skin" 60 about the package wall, sheet and board exterior surfaces, as shown.

I claim:

1. In a thin walled, light-weight, relatively flexible, molded plastic package having first and second re-entrant recesses respectively at opposite sides of the package, the package stiffened against crushing, comprising
    (a) said first re-entrant recess at one side of the package containing sufficient of a predetermined quanity of an expanded synthetic resin as to substantially fill said recess,
    (b) said expanded resin cured to form a hardened re-inforcing core in said first re-entrant recess and integrally with the package to stiffen same against crushing, whereby an article or articles placed in the second re-entrant recess at the opposite side of the package are protected against crushing,
    (c) said first recess extending lengthwise at least part way about said second recess having rectangular frame configuration,
    (d) and including a base sheet supporting said frame core, and there being a second frame core consisting of expanded resin and supported on the base sheet within another first re-entrant recess defined by the package which also defines another second re-entrant recess surrounded by the second frame, the base sheet being foldable to bring said frames into superposed relation protecting articles in said second re-entrant recesses.
    (e) and including a cover sheet over a side of the package to cover said first re-entrant recess and said core, and attached to the package.

2. The package of claim 1 including a pressure wall at the side of the package to confine said resin.

3. The package of claim 1 wherein said cover sheet is relatively stiff.

4. The package of claim 1 which consists of polyvinylchloride.

5. The package of claim 1 wherein said expanded resin consists of styrofoam.

6. The method of reinforcing a thin walled. lightweight, relatively flexible and crushable molded plastic package having first and second re-entrant recesses respectively at opposite sides of the package, that includes:
    (a) introducing into said first re-entrant recess at one side of the package sufficient of a predetermined quantity of an expansible synthetic resin as to substantially fill said recess when expanded,
    (b) providing a pressure wall at said side of the package to close said first recess and confine the resin as it expands causing flow ofthe expanding resin parallel to the wall and to substantially fill said recess,
    (c) and allowing said expanded resin to cure and form a hardened re-inforcing core in said first re-entrant recess and integrally with the package to stiffen same against crushing, whereby an article or articles placed in the second re-entrant recess at the opposite side of the package are protected against crushing, and
    (d) including removing said pressure wall away from the package after the resin has completed its expansion.

7. The method of claim 6 wherein said resin introduction into the first recess is carried out by introducing the resin through at least one aperture in said pressure wall.

8. The method of claim 6 including providing a cover sheet over said one side of the package to cover siad first re-entrant recess, and attaching said sheet to the package.

9. The method of claim 8 including locating said cover sheet between said pressure wall and the package, said resin being introduced through both said wall and sheet, into the recess.

10. The method of claim 8 wherein said sheet is relatively stiff.

11. The method of claim 6 wherein said package consists of polyvinylchloride.

12. The method of claim 6 wherein said resin consists of styrofoam.

13. The method of claim 6 wherein said first recess extends lengthwise at least part way about said second recess, and said (a) step is carried out by introducing the resin into the first opening at multiple locations along its length.

14. The method of claim 6 wherein said steps (b) and (c) are carried out to form said resin core in rectangular frame configuration.

15. The reinforced package produced by the method of one of claims 6, 7 to 14.